US008554540B2

(12) United States Patent
Lee et al.

(10) Patent No.: US 8,554,540 B2
(45) Date of Patent: Oct. 8, 2013

(54) TOPIC MAP BASED INDEXING AND SEARCHING APPARATUS

(75) Inventors: Chung Hee Lee, Daejeon (KR); Hyo-Jung Oh, Daejeon (KR); Jeong Heo, Daejeon (KR); Yi Gyu Hwang, Daejeon (KR); Yeo Chan Yoon, Daejeon (KR); Miran Choi, Daejeon (KR); Chang Ki Lee, Daejeon (KR); Soojong Lim, Daejeon (KR); HyunKi Kim, Daejeon (KR); Myung Gil Jang, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 948 days.

(21) Appl. No.: 12/484,651

(22) Filed: Jun. 15, 2009

(65) Prior Publication Data
US 2010/0153094 A1    Jun. 17, 2010

(30) Foreign Application Priority Data
Dec. 11, 2008   (KR) .................. 10-2008-0125622

(51) Int. Cl.
*G06F 17/27*   (2006.01)

(52) U.S. Cl.
USPC ............... 704/9; 717/123; 717/104; 707/608; 706/50; 706/47; 706/11; 705/7.17; 703/27

(58) Field of Classification Search
USPC ............ 704/9; 706/42, 50, 47, 11; 717/126, 717/104; 707/608; 705/7.17; 703/27
See application file for complete search history.

(56) References Cited

U.S. PATENT DOCUMENTS

| 5,696,962 | A  | * | 12/1997 | Kupiec | 1/1 |
| 6,314,411 | B1 | * | 11/2001 | Armstrong | 706/11 |
| 6,460,029 | B1 | * | 10/2002 | Fries et al. | 1/1 |
| 6,601,059 | B1 | * | 7/2003 | Fries | 1/1 |
| 7,209,876 | B2 | * | 4/2007 | Miller et al. | 704/9 |
| 7,433,876 | B2 | * | 10/2008 | Spivack et al. | 1/1 |

(Continued)

FOREIGN PATENT DOCUMENTS

| JP | 2006-215753 | 8/2006 |
| KR | 10-2001-0107111 | 12/2001 |
| KR | 10-2005-0112883 | 12/2005 |
| KR | 10-2008-0100923 | 11/2008 |

OTHER PUBLICATIONS

"Retrieving Answers from Frequently Asked Questions Pages on the Web", Valentin Jijkoun et al., ACM 14th Conference on Information and Knowledge Management (CIKM 2005) pp. 76-83, Oct. 2005.

*Primary Examiner* — Michael Colucci
(74) *Attorney, Agent, or Firm* — Staas & Halsey LLP (57) ABSTRACT

A topic map based indexing apparatus analyzes community Q/A lists to acquire Q/A analysis information, removes redundant answers depending on the Q/A analysis information, removes insignificant answers based on the degree of reliability, ranks answer lists, and extracts the highest ranking answer as a best answer, to thereby store, in a community Q/A topic map, index information containing the community Q/A lists and the Q/A analysis information. A topic map based searching apparatus analyzes a user question to acquire question analysis information, searches similar questions from community Q/A lists belonging to a specific topic node of a pre-stored community Q/A topic map, ranks the searched similar questions depending on the question analysis information, removes redundant answers among answers to the ranked similar questions, ranks the answers, and extracts the highest ranking answer as a best answer.

9 Claims, 8 Drawing Sheets

(56) References Cited

U.S. PATENT DOCUMENTS

| | | | |
|---|---|---|---|
| 7,454,398 B2* | 11/2008 | Kehlenbeck et al. | 706/50 |
| 7,555,475 B2* | 6/2009 | Quiroga et al. | 1/1 |
| 7,620,624 B2* | 11/2009 | Stata et al. | 1/1 |
| 7,698,316 B2* | 4/2010 | Song et al. | 707/608 |
| 7,925,492 B2* | 4/2011 | Visel | 703/27 |
| 2003/0101153 A1* | 5/2003 | Francis et al. | 706/47 |
| 2004/0243568 A1* | 12/2004 | Wang et al. | 707/3 |
| 2006/0004703 A1* | 1/2006 | Spivack et al. | 707/2 |
| 2007/0288436 A1* | 12/2007 | Cao | 707/3 |
| 2008/0154833 A1* | 6/2008 | Jessus et al. | 706/47 |
| 2008/0319936 A1* | 12/2008 | Wong et al. | 706/47 |
| 2009/0043631 A1* | 2/2009 | Finlayson et al. | 705/9 |
| 2009/0300586 A1* | 12/2009 | Bernardini et al. | 717/126 |

* cited by examiner

TOPIC MAP BASED INDEXING AND SEARCHING APPARATUS

CROSS-REFERENCE(S) TO RELATED APPLICATIONS(S)

The present invention claims priority of Korean Patent Application No. 10-2008-0125622, filed on Dec. 11, 2008, which is incorporated herein by reference.

FIELD OF THE INVENTION

The present invention relates to a searching technique based on a topic map, and more particularly, to a topic map based indexing apparatus, and a topic map based searching apparatus, which are suitable to provide an answer to a question by using community question/answer ("Q/A") lists based on a topic map.

BACKGROUND OF THE INVENTION

As well-known in the art, with the rapid spread of the Internet all over the world, electronic commerce targeted on people throughout the world has been conducted through a medium of the Internet. Also, with the gradual development of the communication function between users, communications in various forms have been performed through the Internet.

In addition to electronic mail and file transmission, which are the most basic communication forms using the Internet, Internet telephony has been used as a substitution for wired telephony. Also, with the use of the Internet, a short message may be transmitted to a mobile telephone, and multilateral communications have been conducted through various types of chatting including text chatting, voice chatting and video chatting. Moreover, communities in which a plurality of users can exchange data, opinions, and the like about the same subject have been activated.

There are many forms of communities such as cafes, blogs, homepages, clubs, and mini-homepages, each of which puts diverse contents therein. Generally, users who have subscribed as members in a cafe or club community communicate with each other by putting contents such as data or information about a certain subject on a bulletin board of the cafe or club community. In case of a blog community, mini-homepage or the like, the user who has established it posts his/her opinions or data.

Among other things, it has been troublesome for a user to see or access desired contents put in such communities, in that the user must access the communities directly and search for the contents. However, by virtue of recent developments of search technologies, only a keyword corresponding to the contents the user wants to find is entered in a web browser, so that contents in categories, such as web documents, news, images, and online dictionaries, can be searched for the keyword. In addition, cafe or blog communities containing subject matters corresponding to the keyword can also be involved in the search. Thus, the user can easily search for the contents put in the communities without accessing the communities separately, and can easily find communities containing subject matters related to the keyword.

As other techniques, there are some conventional techniques for searching desired contents in response to a user's query. The first technique is to use an integrated search system of FAQ (frequently asked questions) list search and interactive DB search, as well as document processing on a web site. The integrated search system employs three search methods, including interactive DB search, frequently asked questions (FAQ) list search, and website query-answer, so that an optimal search and reply process, can be done by distributing a user's query to each realm.

The second technique is a technique that searches communities providing reliable contents on a network using a keyword and provides a user with the search results. This technique searches communities containing information that matches the keyword from the user via the network, measures degrees of reliability of the searched communities, and sequentially arranges the searched communities depending on the measured degrees of reliability or selects only communities having more than a predetermined degree of reliability to provide them to the user.

The third technique relates to a technique of answering to a natural language question by using a large volume of FAQ web pages. As this technique, there is proposed a technique of collecting FAQ pages from the Web, automatically extracting question/answer portions therefrom, and searching question/answer lists appropriate for a user's question to extract a best answer.

However, among the conventional search techniques the first technique has a limitation in the improvement of the search performance because the FAQ list search is targeted at a small amount of data randomly existed on the Web and the performance of mechanical analysis used in search techniques is low. The second technique searches only the communities most appropriate for a user's question by calculating the degrees of reliability for a variety of communities scattered over the Web. Therefore, the second technique has a problem that the user has to search community contents again in order to find his or her desired best answer. The third technique performs the search that is not targeted at questions/answers accumulated in communities but at a few FAQ lists on the Web and extracts the FAQ lists through a general search engine, which induces an error in the search. In addition, the third technique uses only a simple keyword matching technique considering location in the search of the best answer, and thus has a limitation in improving the search performance.

SUMMARY OF THE INVENTION

In view of the above, the present invention provides a topic map based indexing apparatus, and a topic map based searching apparatus, which is capable of providing an answer to a question by using community Q/A lists based on a topic map.

In accordance with a first aspect of the present invention, there is a topic map based indexing apparatus, including: a Q/A pre-processing block for normalizing community Q/A lists in a single form, correcting grammatical errors, and removing insignificant symbols; a Q/A analysis block for analyzing the community Q/A lists to acquire Q/A analysis information; and a Q/A storage block for storing, in a community Q/A topic map, index information containing the community Q/A lists and the Q/A analysis information by removing redundant answers depending on the Q/A analysis information, removing insignificant answers based on the degree of reliability, ranking answer lists, extracting the highest ranking answer as a best answer, and determining a topic.

In accordance with a second aspect of the present invention, there is a topic map based searching apparatus, including: a question pre-processing block for normalizing a user question in a single form, correcting grammatical errors and removing insignificant symbols; a question analysis block for analyzing the user question to acquire question analysis information; a similar question search block for limiting a search space to a specific topic node of a pre-stored community Q/A topic map depending on the question analysis information, searching similar questions from community Q/A lists belonging to the limited search space, and ranking the searched similar questions depending on the question analysis information; and an answer extraction block for removing redundant answers among answers to the ranked similar questions, ranking the answers, and extracting the highest ranking answer as a best answer.

As described above, unlike the conventional method in which a FAQ list search and an interactive DB search are combinedly performed, communities are searched depending on the degrees of reliability, or an answer to a natural language question is searched by using FAQ web pages, the present invention can store community Q/A lists in a community Q/A topic on a topic map basis in advance, acquire question analysis information by pre-processing and analysis of a user question upon receipt thereof, and searches its similar questions from the community Q/A topic map based on the question analysis information and ranks them, thereby effectively extracting a corresponding best answer. Thus, by effectively analyzing the user question, the most appropriate best answer can be searched through the pre-stored community Q/A topic map, together the improvement of the performance of searching various questions.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, exemplary embodiments of the present invention will be described in detail with reference to the accompanying drawings.

Figure 1:
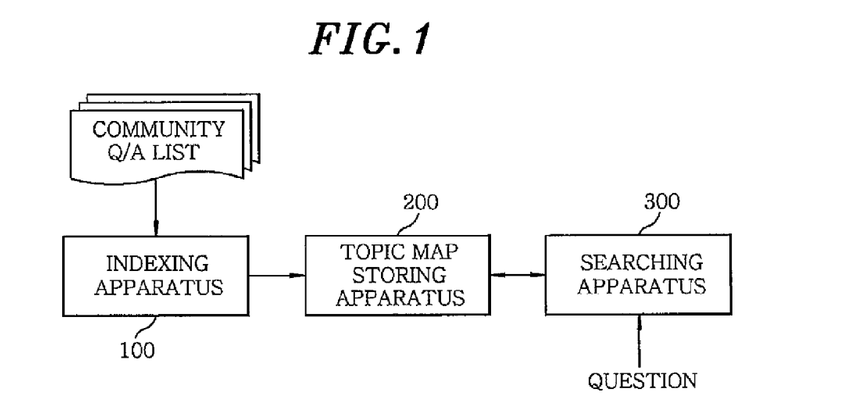
FIG. 1 shows a block diagram of a topic map based searching system appropriate to provide an answer to a question on a topic map basis in accordance with an exemplary embodiment of the present invention.

FIG. 1 illustrates a block diagram of a topic map based searching system appropriate to provide an answer to a question on a topic map basis in accordance with an exemplary embodiment of the present invention. The inventive topic map based searching system includes an indexing apparatus 100, a topic map storing apparatus 200, and a searching apparatus 300. It is noted that the indexing apparatus 100, the topic map storing apparatus 200, and the searching apparatus 300 are connected via various communication networks to perform data communications in the following description.

Referring to FIG. 1, the indexing apparatus 100 includes a server and so on (not shown), which detect and analyze community Q/A lists from plural community sites on Web and then index the community Q/As on a topic map basis. To be more specific, the indexing apparatus 100 recognizes the detected community Q/A lists as one unit and performs pre-processing such as error correction, executes an analysis process, such as language analysis, domain determination, classification by topic, type analysis, keyword extension and constraint word extraction on the community Q/A lists. Further, the indexing apparatus 100 then, by use of Q/A analysis information, produces index information containing relevant community Q/A lists and the Q/A analysis information at corresponding topic nodes. The index information is then provided to the topic map storing apparatus 200 for its storage.

Figure 2:
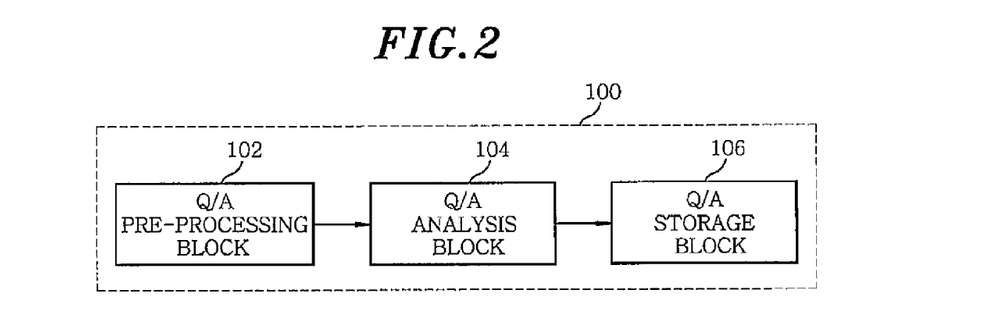
FIG. 2 illustrates a block diagram of an indexing apparatus to analyze community Q/A lists and provide index information containing the community Q/A lists in accordance with the present invention.

FIG. 2 shows a detailed block diagram of the indexing apparatus 100 to provide index information containing the community Q/A lists shown in FIG. 1. As shown, the indexing apparatus 100 is provided with a Q/A pre-processing block 102, a Q/A analysis block 104, and a Q/A storage block 106.

With reference to FIG. 2, the indexing apparatus 100 will now be described in more detail. The Q/A pre-processing block 102 pre-process the community Q/A lists by normalizing words that can be recognized as one unit, in a single form, correcting grammatical errors and removing insignificant symbols therein. The community Q/As lists pre-processed by the Q/A pre-processing block 102 is then provided to the Q/A analysis block 104.

The Q/A analysis block 104 performs language analysis on morphemes, named entity, syntaxes, etc. with respect to the community Q/As, determines the domains of the community Q/As, classifies the community Q/As by topic, analyzes the types of the community Q/As, extracts important keywords to additionally extend the range of similar words corresponding to the keywords, and extracts constraint words, which are restrictions in the search, thereby acquiring Q/A analysis information. The acquired Q/A analysis information is then delivered to the Q/A storage block 106.

Next, the Q/A storage block 106 excludes redundant answers from the community Q/As depending on the Q/A analysis information, removes insignificant answers from the community Q/As based on the degree of reliability of the contents of the answers and the information of the answerer, ranks the answers of the community Q/As to extract the highest ranking answer as a best answer, and determines a classified topic, thereby obtaining index information containing the community Q/A list with the correct answer and Q/A analysis results at a topic node of the determined topic. The index information is then provided to the topic map storing apparatus 200 for storage thereof.

Figure 3:
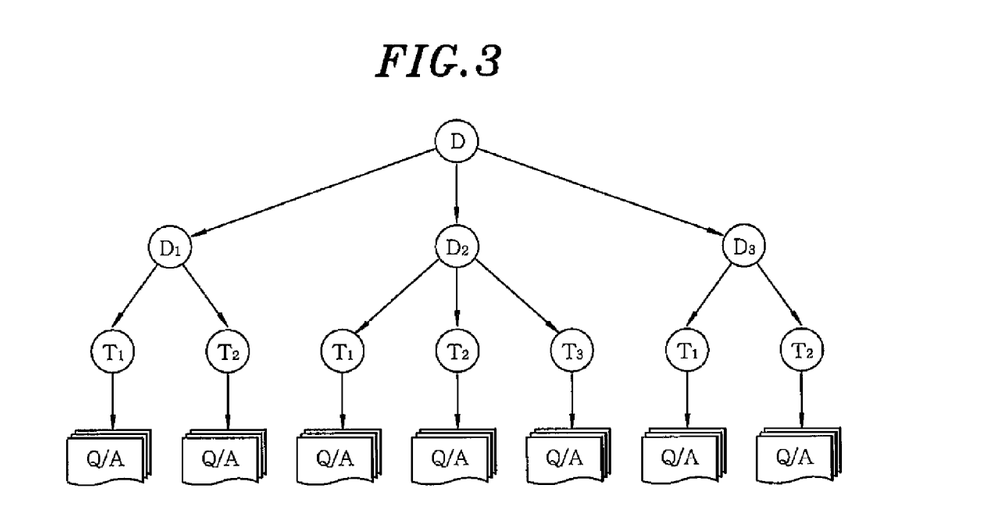
FIG. 3 presents a view showing a community topic map in accordance with the present invention.

Referring back to FIG. 1, the topic map storing apparatus 200 includes a database (not shown) that stores the index information containing the community Q/A lists and the Q/A analysis information on a topic map basis. Upon receipt of the index information from the indexing apparatus 100, the topic map storing apparatus 200 creates a community Q/A topic map on which the index information is stored. The community Q/A lists stored on the community Q/A topic map is selectively extracted if required, and transmitted to the searching apparatus 300 via a communication network. In one example, FIG. 3 is a view showing a community Q/A topic map in accordance with the present invention, which illustrates community Q/A lists stored on a topic map basis corresponding to respective topic nodes (for example, D, $D_1$, $D_2$, $D_3$, $T_1$, $T_2$, $T_3$, etc.)

The searching apparatus 300 includes a terminal, a server, or the like which analyzes a question from a user, and then detect an answer to the question on a topic map basis. In the searching apparatus 300, the question is recognized as one unit for pre-processing such as error correction, subjected to an analysis process, such as language analysis, domain determination, classification by topic, type analysis, keyword extension, and constraint word extraction. The searching apparatus 300 searches similar questions from the community Q/A topic map stored in the topic map storing apparatus 200 based on the analyzed question, ranks the searched similar questions, and ranks answers to these similar questions to extract a best answer (i.e., the answer of the highest ranking).

Figure 4:
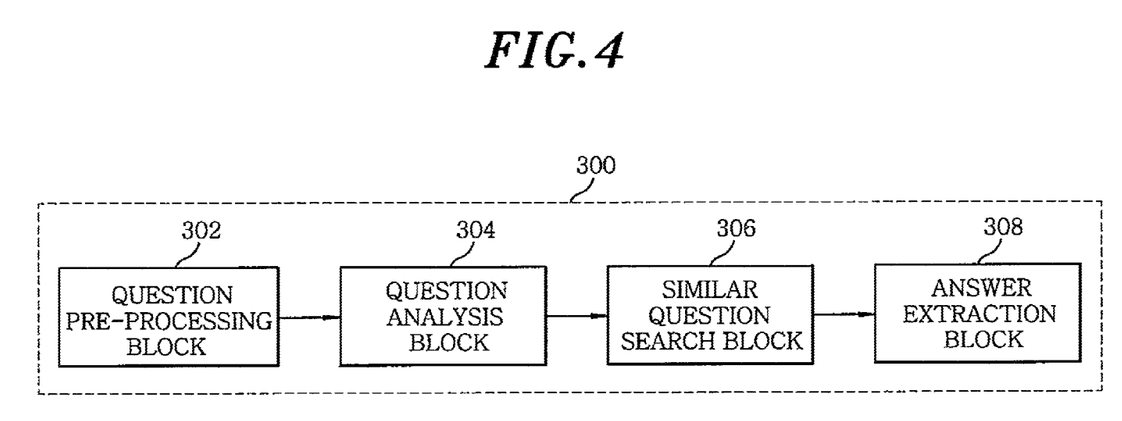
FIG. 4 illustrates a block diagram of a searching apparatus to search an answer to a question on a topic map basis in accordance with the present invention.

FIG. 4 illustrates a detailed block diagram of the searching apparatus to search an answer to a question on a topic map basis in accordance with the present invention. The searching apparatus 300 includes a question pre-processing block 302, a question analysis block 304, a similar question search block 306, and an answer extraction block 308.

With reference to FIG. 4, the searching apparatus 300 will now be described in more detail. The question pre-processing block 302 normalizes, in a single form, words recognizable as one unit within a question from a user, corrects grammatical errors and removes insignificant symbols in the question. The pre-processed question is then provided to the question analysis block 304.

The question analysis block 304 performs language analysis of morphemes, named entity, syntaxes, etc., determines the domain of the question, classifies the question by topic, analyzes the type of the question, extracts an important keyword from the question to extend the range of similar words, and extracts constraint words from the question, which becomes restriction condition in the search, thereby obtaining question analysis information. The question analysis information acquired by the question analysis block 304 is then delivered to the similar question search block 306.

Next, the similar question search block 306 limits the community Q/A lists to be searched to specific topic nodes of the community Q/A topic map based on the question analysis information, searches similar questions from the limited community Q/A lists on the specific topic nodes, ranks the similar questions on the basis of question analysis information. The ranked similar questions are then provided to the answer extraction block 308.

Lastly, the answer extraction block 308 removes any redundant answers with the same meaning among candidate answers to the ranked similar questions, ranks the candidate answers, and extracts the highest ranking answer as the best answer.

The following is a description for detailed configurations of the Q/A pre-processing block 102, the Q/A analysis block 104, and the Q/A storage block 106 constituting the indexing apparatus 100 in the topic map based searching system having the above-described configuration.

Figure 5:
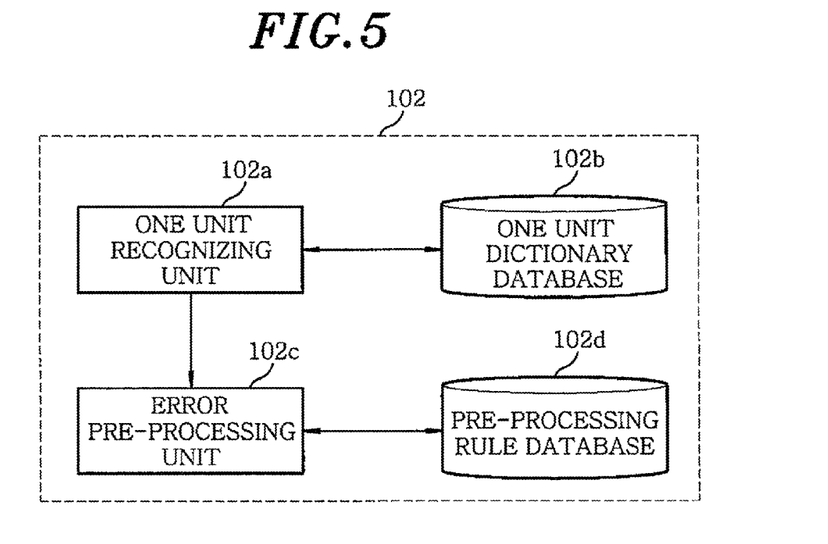
FIG. 5 provides a detailed block diagram of the Q/A pre-processing block shown in FIG. 2.

FIG. 5 illustrates a detailed block diagram of the Q/A pre-processing block 102 shown in FIG. 2. The Q/A pre-processing block 102 includes a first one unit recognizing unit 102a, a first one unit dictionary database (DB) 102b, a first error pre-processing unit 102c, and a first pre-processing rule DB 102d.

With reference to FIG. 5, the Q/A pre-processing block 102 will now be described in more detail. The first one unit dictionary DB 102b stores allomorph words, game names, item names, and so on that are first one recognized as one unit, and the first pre-processing rule DB 102d stores grammar error rules, analysis error rules, and so on. The first one unit recognizing unit 102a normalizes, in a single form, allomorph words of the same meaning or game names, quest names, and the like recognizable as one unit within the detected community Q/A lists by referring to the first one unit dictionary DB 102b. In one example, allomorph words, e.g., 'Dunpa', 'Dungeon & Fighter', 'Dunjun & Fighter', etc., may be normalized as 'Dungeon & Fighter'; a game name 'Dynasty War' may be recognized as one unit, hathat10, an item name 'Sword of Genius' may be recognized as one unit, hithit2.

The first error pre-processing unit 102c corrects various grammatical errors, such as errors in word spacing and mistyping of the community Q/As, by referring to the first pre-processing rule DB 102d and removes insignificant symbols which may generate an error in language analysis. For example, a grammatical error in 'WhenStar 2 will be put on sale?' may be corrected to 'When Star 2 will be put on sale?', and 'Lineage dies in the course of . . . geeeee' may be corrected to 'Lineage dies in the course of' by removing the insignificant symbol ' . . . geeeee'.

Figure 6:
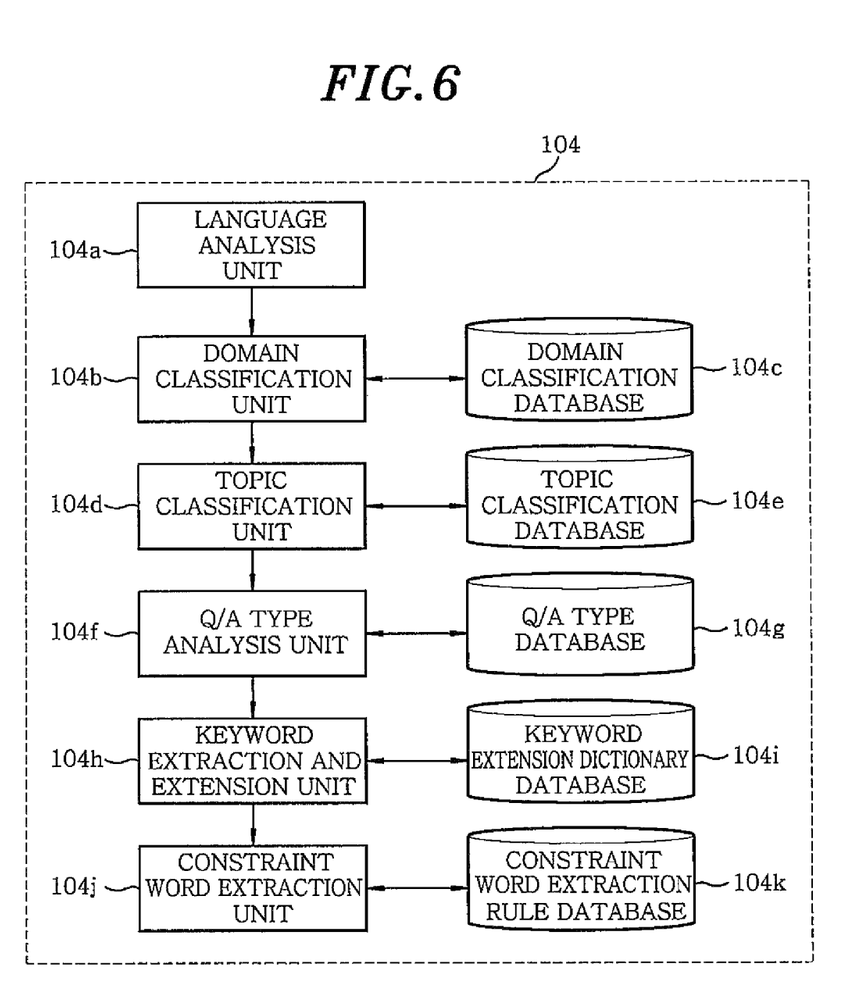
FIG. 6 depicts a detailed block diagram of the Q/A analysis block shown in FIG. 2.

FIG. 6 illustrates a detailed block diagram of the Q/A analysis block shown in FIG. 2. The Q/A analysis block 104 includes a first language analysis unit 104a, a first domain classification unit 104b, a first domain classification DB 104c, a first topic classification unit 104d, a first topic classification DB 104e, a first Q/A type analysis unit 104f, a first Q/A type DB 104g, a first keyword extraction and extension unit 104h, a first keyword extension dictionary DB 104i, a first constraint word extraction unit 104j, and a first constraint word extraction rule DB 104k.

With reference to FIG. 6, the Q/A analysis block 104 will now be described in more detail. The first language analysis unit 104a performs language analysis on community Q/A lists by morpheme analysis, named entity recognition, partial syntactic analysis and the like to acquire the language analysis results of the community Q/As.

The first domain classification unit 104b determines the domains (e.g., the fields of games, movies, news, etc.) of the community Q/A lists by referring to the first domain classification DB 104c storing domains by genre therein, and the first topic classification unit 104d classifies the community Q/A lists depending on a certain topic among a variety of topics in the topic map by referring to the first topic classification DB in a hierarchical structure.

The first Q/A type analysis unit 104f analyzes the type of a desired community answer by analyzing the intention of a community question with reference to the first Q/A type DB 104g storing information on the types of the community Q/A lists. The first keyword extraction and extension unit 104h extracts important keywords depending on the language analysis results of the community Q/As, and then additionally extends the range of similar words corresponding to the keywords by referring to the first keyword extension dictionary DB 104i storing various keywords and similar words corresponding to the keywords.

The first constraint word extraction unit 104j extracts constraint words, such as time or location, by referring to the first constraint word extraction rule DB 104k storing search constraint information.

For example, in case where "What is the final weapon of Tider in the Final Fantasy 10?", analysis results by each component in the community question are represented as follows. That is, the result of morpheme analysis of this community question may be represented by 'What/IG is/BE the/AT final weapon/NN of/PP Tider/NN in/PP the/AT Final Fantasy/NN 10/NU ?/SY'; the result of named entity recognition thereof may be represented by 'What is the final weapon of <Tider:PS_CHARACTER> in the <Final Fantasy 10:TMIG_SW>?'; the result of partial syntactic analysis thereof may be represented by '<final weapon of Tider: GNP>' (?); the result of domain classification thereof can be represented by 'games field'; the result of topic classification thereof may be represented by 'items'; the result of Q/A type analysis thereof may be represented by 'TMIG_ITEM'. In addition, keywords 'Final Fantasy 10', 'Tider+final weapon', 'Tider', and 'final weapon' may be extracted, 'Final Fantasy' may be extended to 'FF', 'FinalFantasy' and so on as similar word, 'Tider' may be extended to 'Tidar' as similar word, 'final weapon' may be extended to 'the strongest final weapon', 'the strongest weapon' and so on as similar word, and there is no constraint word. In morpheme analysis, 'NN' denotes a noun, 'NU' denotes a number, 'PP' denotes a postpositional word, 'AT' denotes a article, 'IG' denotes an interrogative, 'BE' is be verb, and 'SY' denotes a symbol. In named entity recognition, 'TMIG_SW' denotes software, and 'PS_CHARACTER' denotes a character. In partial syntactic analysis, 'GNP' denotes a genitive phrase, and in Q/A type analysis, 'TMIG_ITEM' denotes item type.

Figure 7:
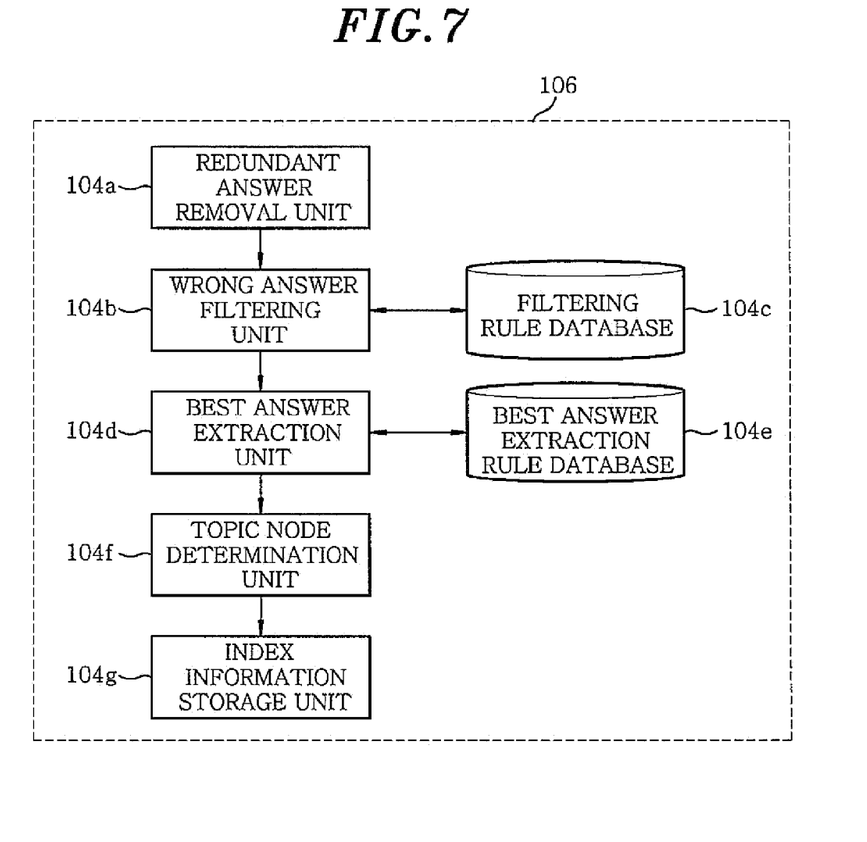
FIG. 7 offers a detailed block diagram of a Q/A storage block shown in FIG. 2.

FIG. 7 presents a detailed block diagram of the Q/A storage block 106 shown in FIG. 2. The Q/A analysis block 106 includes a first redundant answer removal unit 106a, a wrong answer filtering unit 106b, a filtering rule DB 106c, a best answer extraction unit 106d, a best answer extraction rule DB 106e, a topic node determination unit 106f, and an index information storage unit 106g.

With reference to FIG. 7, the Q/A storage block 102 will now be described in more detail. The first redundant answer removal unit 106a removes any redundant answers having the same meaning from community answer lists to a community question while leaving only one answer.

The wrong answer filtering unit 106b removes insignificant answers having nothing to do with the question from the community answer lists based on the contents of the answers and the reliability of the answerers by referring to the filtering rule DB 106c storing filtering rules that consist of the contents of the answers and the reliability of the answerers.

The best answer extraction unit 106d ranks the community answer lists, and then extracts the highest ranking community answer list as a best answer by referring to the best answer extraction rule DB 106e storing the rules for extracting the best answer by using the ranked answer lists.

The topic node determination unit 106f determines a topic (e.g., item) appropriate for a community question depending on the classification of topics; and the index information storage unit 106g generates index information containing community Q/A lists from which the best answer is extracted and the Q/A analysis information from the Q/A analysis block 104. The index information is then transmitted to the topic map storing apparatus 200 so that it is stored in topic nodes corresponding to the determined topic.

The following is a description for detailed configurations of the question pre-processing block 302, the question analysis block 304, and the similar question search block 306, and the answer extraction block 308 constituting the searching apparatus 300 in the topic map based searching system having the above-described configuration.

Figure 8:
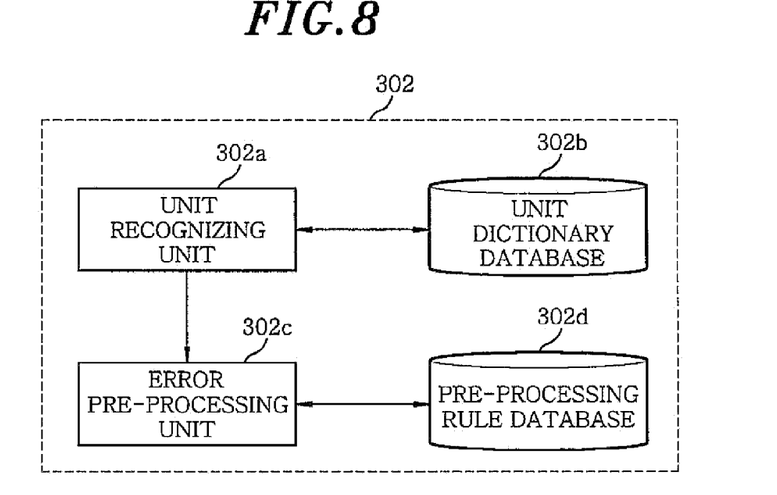
FIG. 8 shows a detailed block diagram of the question pre-processing block shown in FIG. 4.

FIG. 8 illustrates a detailed block diagram of the question pre-processing block 302 shown in FIG. 4. The question pre-processing block 302 includes a second one unit recognizing unit 302a, a second one unit dictionary DB 302b, a second error pre-processing unit 302c, and a second pre-processing rule DB 302d.

With reference to FIG. 8, the question pre-processing block 302 will now be described in more detail. The second one unit recognizing unit 302a normalizes, in a single form, allomorph words of the same meaning or words recognizable as one unit, such as game names or quest names in a user question by referring to the second one unit dictionary DB 302b. Here, the second one unit dictionary DB 302b provides database storing allomorph words, game names, item names and so on.

The second error pre-processing unit 302c corrects various grammatical errors, such as errors in word spacing and mistyping, and removes insignificant symbols which may causes an error in language analysis.

In this case, the question pre-processing block 302 may perform pre-processing on a user question in the same manner as in the example described with respect to the Q/A pre-processing block 102 of the indexing apparatus 100.

Figure 9:
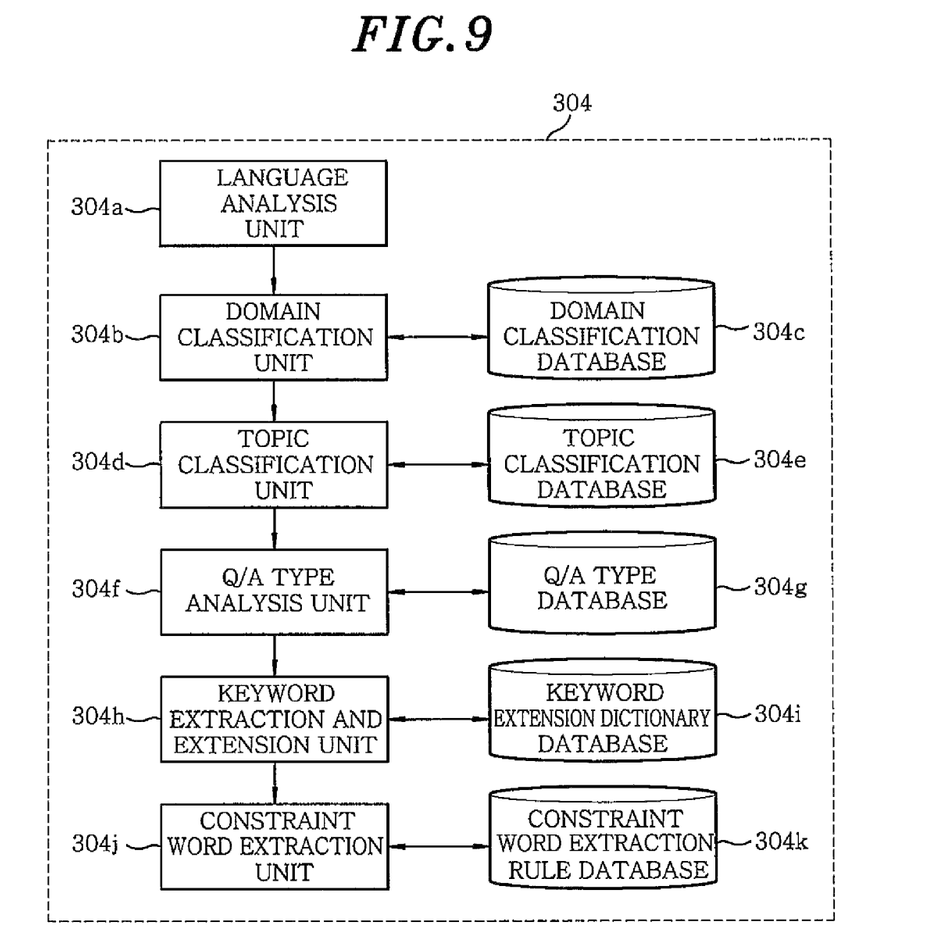
FIG. 9 illustrates a detailed block diagram of the question analysis block shown in FIG. 4.

FIG. 9 provides a detailed block diagram of the question analysis block 304 shown in FIG. 4. The question analysis block 304 includes a second language analysis unit 304a, a second domain classification unit 304b, a second domain classification DB 304c, a second topic classification unit 304d, a second topic classification DB 304e, a second Q/A type analysis unit 304f, a second Q/A type DB 304g, a second keyword extraction and extension unit 304h, a second keyword extension dictionary DB 304i, a second constraint word extraction unit 304j, and a second constraint word extraction rule DB 304k.

With reference to FIG. 9, the question analysis block 304 will now be described in more detail. The second language analysis unit 304a performs language analysis on a user question by morpheme analysis, named entity recognition, partial syntactic analysis, etc. to acquire the language analysis result.

The second domain classification unit 304b determines the domain (e.g., the field of games, movies, news, etc.) of the user question by referring to the second domain classification DB 304c providing a database of domains by genre, and the second topic classification unit 304d classifies the user question depending on a certain topic among various topics of the topic map by referring to the second topic classification DB 304e storing a variety of classified topics in a hierarchical structure.

The second Q/A type analysis unit 304f analyzes the type of a expected answer by analyzing the intention of a user question with reference to the second Q/A type DB 304g storing information on the expected answer type; and the second keyword extraction and extension unit 304h extracts important keywords based on the language analysis results of the user question and then additionally extends the range of similar words corresponding to the keywords by referring to the second keyword extension dictionary DB 304i storing a variety of keywords and similar words corresponding to the keywords.

The second constraint word extraction unit 304j extracts constraint words, such as time or location by referring to the second constraint word extraction rule DB 304k storing search constraint information.

In this regard, the question analysis block 302 may perform pre-processing on a user question in the same manner as in the example described with respect to the Q/A analysis block 104 of the indexing apparatus 100.

Figure 10:
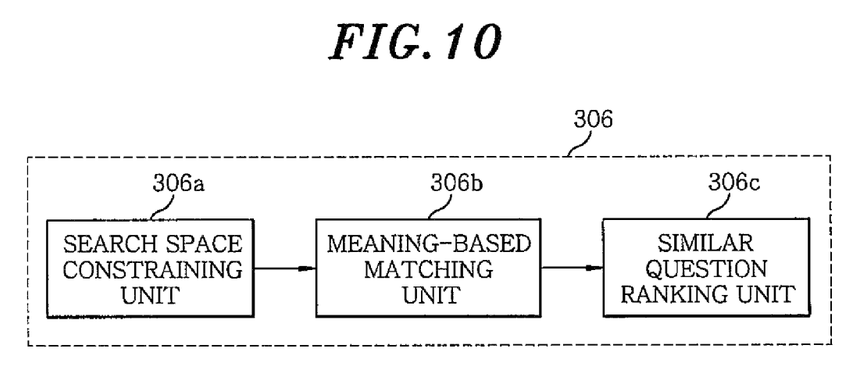
FIG. 10 presents a detailed block diagram of the similar question search block shown in FIG. 4.

FIG. 10 shows a detailed block diagram of the similar question search block 306 shown in FIG. 4. The similar question search block 306 includes a search space constraining unit 306, a semantic-based matching unit 306b, and a similar question ranking unit 306c.

With reference to FIG. 10, the similar question search block 306 will now be described in more detail. The search space constraining unit 306a limits the community Q/A lists, from which an answer to a user question is to be searched, to the lists at the topic nodes corresponding to classified topics in a community Q/A topic map by using the results of domain classification and topic classification among the question analysis information.

The semantic-based matching unit 306b searches all of similar questions from the community Q/A lists at the topic nodes corresponding to the classified topics from the topic map storing apparatus 200 by using significant indexes (e.g., keyword, similar word, etc.) extracted from the question analysis information.

The similar question ranking unit 306c detects community Q/A lists containing the searched similar questions from the topic map storing apparatus 200 and ranks them based on the question analysis information.

Figure 11:
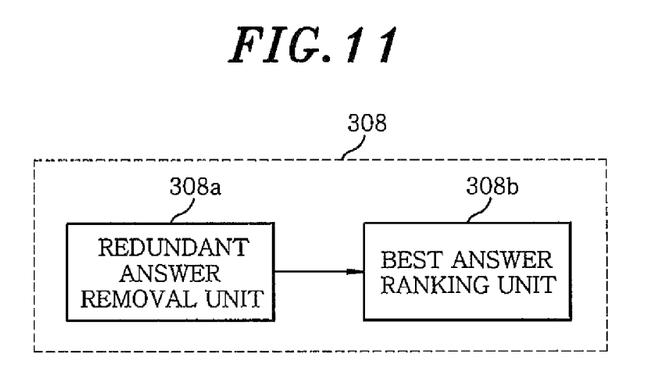
FIG. 11 depicts a detailed block diagram of the answer extraction block shown in FIG. 4.

FIG. 11 offers a detailed block diagram of the answer extraction block 308 shown in FIG. 4. The answer extraction block 308 includes a second redundant answer removal unit 308a and a best answer ranking unit 308b.

With reference to FIG. 11, the answer extraction block 308 will now be described in more detail. If there are any redundant answers having the same meaning in the community answer lists to similar questions among the ranked community Q/A lists, the second redundant answer removal unit 308a removes all of the redundant answers to leave only one answer. The best answer ranking unit 308b ranks the answers to the similar questions and outputs the highest ranking answer as a best answer.

Figure 12:
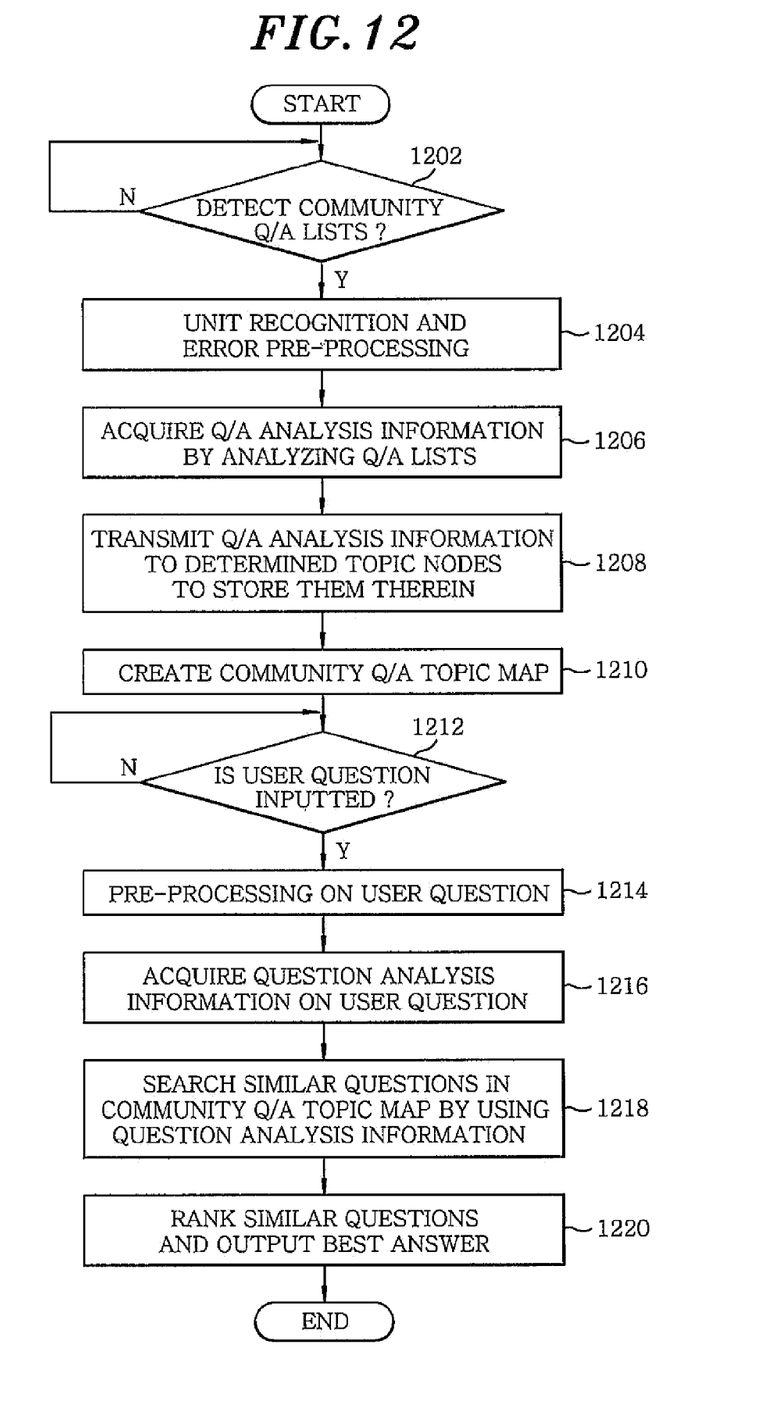
FIG. 12 illustrates a flow chart for explaining a process of searching an answer to a user question by using a pre-stored community Q/A topic map in accordance with a first embodiment of the present invention.

The following is a description of a process of searching an answer to a user question by using a pre-stored community Q/A topic map in accordance with a first embodiment of the present invention with reference to FIG. 12 which illustrates a flow chart for explaining the process.

Referring to FIG. 12, if the indexing apparatus 100 detects community Q/A lists from plural community sites in step 1202, a control process goes to step 1204 where the Q/A pre-processing block 102 of the indexing apparatus 100 normalizes, in a single form, words recognizable as one unit within the community Q/A lists as detected, and performs pre-processing, such as grammatical error correction, insignificant symbol removal, etc., and delivers the pre-processed results to the Q/A analysis block 104.

Then, in step 1206, the Q/A analysis block 104 of the indexing apparatus 100 acquires Q/A analysis information by analyzing the community Q/A lists in a manner to perform language analysis on morphemes, named entity, syntaxes, etc., determine the domains of the community Q/As, classify the community Q/As by topic, analyze the types of the community Q/As, extract an important keyword to extend the range of similar words, and extract constraint words, and delivers the Q/A analysis information to the Q/A storage block 106.

Next, in step 1208, the Q/A storage block 104 of the indexing apparatus 100 removes redundant answers from the community Q/As based on the Q/A analysis information, removes insignificant answers depending on the degree of reliability of the contents of the answers and the information of the answerer, ranks the answer lists of the community Q/As and then extracts the highest ranking answer as a best answer, determines a classified topic, and transmits index information containing the community Q/A list with the best answer and Q/A analysis results to determined topic nodes so as to store them in the topic map storing apparatus 200.

Thus, the topic map storing apparatus 200 creates and stores a community Q/A topic map by using the index information transmitted in step 1210.

Next, in step 1212, the searching apparatus 300 checks whether a user question is received.

As a result of checking in the step 1212, upon receipt of the user question, the question pre-processing block 302 of the searching apparatus 300 performs question pre-processing, including normalizing, in a single form, words recognizable as one unit with respect to the user question, correcting diverse grammatical errors, and removing insignificant symbols, and provides the pre-processed user question to the question analysis block 304 in step 1214.

After that, in step 1216, the question analysis block 304 analyzes the user question by performing language analysis of morphemes, named entity, syntaxes, etc., determining the domain of the user question, classifying the user question by topic, analyzing the type of the user's question, extracting an important keyword to extend the range of similar words, and extracting constraint words, and then delivers the question analysis information to the similar question search block 306.

Next, in step 1218, the similar question search block 306 of the searching apparatus 300 limits the community Q/A lists from which the user question is to be searched to a specific topic node of the community topic map stored in the topic map storing apparatus 200 based on the question analysis information, searches similar questions from the community Q/A lists as limited, ranks the similar questions depending on the question analysis results, and delivers the results to the answer extraction block 308.

Lastly, in step 1220, the answer extraction block 308 of the searching apparatus 300 removes any redundant answers with the same meaning among the answers to the similar questions as ranked, ranks the answers to the similar questions, and extracts the highest ranking answer as the best answer to provide it at its output.

As a result, the topic map based searching system is able to create and store a community Q/A topic map by pre-processing and analysis result, search similar questions, and extract a best answer among the answers to the similar questions.

While the invention has been shown and described with respect to the particular embodiments, it will be understood by those skilled in the art that various changes and modification may be made without departing from the scope of the invention as defined in the following claims.

What is claimed is:

1. A topic map based indexing apparatus, comprising:
a question/answer (Q/A) pre-processing block to, by a computer, normalize community Q/A lists for plural different community sites on web, respectively, correct grammatical errors, and remove insignificant symbols, to thereby provide pre-processed community Q/A lists for the plural different community sites, respectively;
a Q/A analysis block to, by a computer, analyze the pre-processed community Q/A lists to acquire Q/A analysis information; and
a Q/A storage block to, by a computer, store, in a community Q/A topic map, index information containing the pre-processed community Q/A lists and the Q/A analysis information, wherein the indexing information is obtained by removing redundant answers depending on the Q/A analysis information, removing insignificant answers based on a degree of reliability, ranking answer lists, extracting a highest ranking answer as a best answer, and determining a topic, wherein the Q/A pre-processing block includes:

a one unit recognizing unit to normalize, in a single form, allomorph words or words recognizable as one unit in the community Q/A lists by referring to a unit dictionary database; and an error pre-processing unit to correct the grammatical errors and remove the insignificant symbols from the community Q/A lists by referring to a pre-processing rule database.

2. The topic map based indexing apparatus of claim 1, wherein the Q/A analysis block includes:

a language analysis unit to perform language analysis on the pre-processed community Q/A lists by morpheme analysis, named entity recognition, and partial syntactic analysis, to thereby provide language analysis results;

a domain classification unit to determine domains of the pre-processed community Q/A lists by referring to a domain classification database;

a topic classification unit to classify the pre-processed community Q/A lists by topic by referring to a topic classification database;

a Q/A type analysis unit to analyze a type of an expected community answer in the pre-processed community Q/A lists based on an intention of a community question with reference to a Q/A type database;

a keyword extraction and extension unit to extract keywords from the pre-processed community Q/A lists depending on the language analysis results by referring to a keyword extension dictionary database, and to additionally extend a range of similar words corresponding to the keywords; and a constraint word extraction unit to extract, from the pre-processed community Q/A lists, constraint words in order to restrict a search space by referring to a constraint word extraction rule database.

3. The topic map based indexing apparatus of claim 1, wherein the Q/A storage block includes:

a redundant answer removal unit to remove redundant answers having the same meaning from the pre-processed community Q/A lists to a community question to leave only one answer;

a wrong answer filtering unit to remove insignificant answers from the pre-processed community Q/A lists provided from the redundant answer removal unit by referring to a filtering rule database based on the degree of reliability;

a best answer extraction unit to rank answers of the pre-processed community Q/A lists provided from the wrong answer filtering unit, and to extract the highest ranking answer as the best answer by referring to a best answer extraction rule database;

a topic node determination unit to determine a topic appropriate for a community question depending on a classification of topics; and an index information storage unit to generate the index information containing the community Q/A lists from which the highest ranking best answer is extracted and the Q/A analysis information, and to store the index information in topic nodes corresponding to the determined topic for storage of the community Q/A topic map.

4. The topic map based indexing apparatus of claim 1, wherein the community Q/A topic map has a tree structure with a plurality of topic nodes for navigating to respective pre-processed community Q/A lists, based on the index information and the Q/A analysis information.

5. A topic map based searching apparatus, comprising:

a question pre-processing block to, by a computer, normalize a user question in a single form, correct grammatical errors and remove insignificant symbols, to thereby provide a pre-processed user question;

a question analysis block to, by a computer, analyze the pre-processed user question to acquire question analysis information; a similar question search block to, by a computer, limit a search space to a specific topic node of a pre-stored community question/answer (Q/A) topic map depending on the question analysis information, the Q/A topic map having stored therein index information containing pre-processed community Q/A lists for plural different community sites on web, respectively, and Q/A analysis information acquired by analyzing the pre-processed community Q/A lists, search similar questions from community Q/A lists belonging to the limited search space, and rank the searched similar questions depending on the question analysis information; and an answer extraction block to, by a computer, remove redundant answers among answers to the ranked similar questions, rank the answers, and extract a highest ranking answer as a best answer, wherein the question pre-processing block includes:

a one unit recognizing unit to normalize, in a single form, allomorph words or words recognizable as one unit with respect to the user question by referring to a unit dictionary database; and an error pre-processing unit to correct the grammatical errors in the user question and remove the insignificant symbols from the user question by referring to a pre-processing rule database.

6. The topic map based searching apparatus of claim 5, wherein the question analysis block includes:

a language analysis unit to perform language analysis on the pre-processed user question by morpheme analysis, named entity recognition, and partial syntactic analysis, to thereby provide a language analysis;

a domain classification unit to determine a domain of the pre-processed user question by referring to a domain classification database;

a topic classification unit to classify the pre-processed user question by topic by referring to a topic classification database;

a Q/A type analysis unit to analyze a type of a desired answer depending on an intention of the user question by referring to a Q/A type database;

a keyword extraction and extension unit to extract keywords from the pre-processed user question on the basis of the language analysis by referring to a keyword extension dictionary database, and to additionally extend a range of similar words corresponding to the keywords; and a constraint word extraction unit to extract constraint words, which are restrictions in a search of time and location from the pre-processed user question by referring to a constraint word extraction rule database.

7. The topic map based searching apparatus of claim 5, wherein the similar question search block includes:

a search space constraining unit to limit the search space from the community Q/A lists from which an answer to the user question is to be searched to the lists at the specific topic node based on a domain classification and topic classification among the question analysis information;

a semantic-based matching unit to search similar questions of the community Q/A lists at the specific topic node by using the keywords and similar words based on the question analysis information; and a similar question ranking unit to detect the community Q/A lists containing the searched similar questions and rank the community Q/A lists based on the question analysis information.

8. The topic map based searching apparatus of claim 5, wherein the answer extraction block includes:

a redundant answer removal unit to remove redundant answers with the same meaning among answer lists to the similar questions in the ranked community Q/A lists; and a best answer ranking unit to rank answers to the similar questions from which the redundant answers have been removed, and provide the highest ranking answer as the best answer.

9. The topic map based searching apparatus of claim 5, wherein the community Q/A topic map has a tree structure with a plurality of topic nodes for navigating to respective pre-processed community Q/A lists, based on the index information and the Q/A analysis information.

* * * * *